United States Patent [19]
Shah et al.

[11] Patent Number: 6,026,455
[45] Date of Patent: Feb. 15, 2000

[54] ARCHITECTURE AND METHOD FOR PROVIDING GUARANTEED ACCESS FOR A RETRYING BUS MASTER TO A DATA TRANSFER BRIDGE CONNECTING TWO BUSES IN A COMPUTER SYSTEM

[75] Inventors: Nilesh Shah, Folsom; James Coke, Cameron Park; Jasmin Ajanovic, Folsom; Dahmane Dahmani, Folsom; Rajeev Prasad, Folsom, all of Calif.

[73] Assignee: Intel Corporation, Santa Clara, Calif.

[21] Appl. No.: 08/201,817

[22] Filed: Feb. 24, 1994

[51] Int. Cl.[7] .................................................. G06F 13/36
[52] U.S. Cl. ............................................. 710/100; 710/240
[58] Field of Search .................................... 395/822, 308, 395/309, 306

[56] References Cited

U.S. PATENT DOCUMENTS

| | | |
|---|---|---|
| 4,320,467 | 3/1982 | Glass ........................................ 710/121 |
| 4,953,072 | 8/1990 | Williams . |
| 5,195,185 | 3/1993 | Marenin ................................... 710/123 |
| 5,253,348 | 10/1993 | Scalise ..................................... 710/113 |
| 5,269,005 | 12/1993 | Heil et al. ................................. 710/49 |
| 5,301,282 | 4/1994 | Amini et al. ............................. 710/113 |
| 5,418,914 | 5/1995 | Heil et al. ................................. 710/113 |

*Primary Examiner*—Paul R. Myers
*Attorney, Agent, or Firm*—Blakely, Sokoloff, Taylor & Zafman LLP

[57] ABSTRACT

A bridge circuit adapted to be associated with a PCI and a secondary bus circuits which bridge circuit includes circuitry for storing an indication that a particular PCI bus master has attempted an access of the secondary bus and has been forced to retry that access, circuitry for masking any retry until the bus is again available, and circuitry for providing an interval during which a retrying PCI bus master is guaranteed access to the secondary bus in favor of a bus master on the secondary bus after the bus is relinquished so that a sequence of retry operations causing a loss of bandwidth on the PCI bus is not generated.

21 Claims, 4 Drawing Sheets

ARCHITECTURE AND METHOD FOR PROVIDING GUARANTEED ACCESS FOR A RETRYING BUS MASTER TO A DATA TRANSFER BRIDGE CONNECTING TWO BUSES IN A COMPUTER SYSTEM

BACKGROUND OF THE INVENTION

1. Field of the Invention

This invention relates to computer systems, and more particularly, to methods and apparatus for accelerating the transfer of data in a computer system utilizing multiple buses by guaranteeing access to retrying bus masters on a faster bus during a selected period.

2. History of the Prior Art

Historically, personal computers have utilized a single bus to transfer data between different internal components of the system. In personal computers using central processing units designed and manufactured by Intel Corporation of Santa Clara, Calif., such buses have typically been designed as either an Industry Standard Architecture (ISA) bus or an Expanded Industry Standard Architecture (EISA) bus. The ISA bus is a sixteen bit data bus while the EISA bus is thirty-two bits wide. Each of these buses functions at a frequency of eight megahertz. These bus widths and the rates at which each of these buses is capable of operating have been found limiting so there have been a number of attempts to increase bus speed.

One recently implemented method of increasing bus speed is to provide an additional, so called, "local bus" which is more closely associated with the central processor than either of the above-mentioned buses and which is capable of running at speeds that more closely approximate the speed at which the processor itself runs. Those system components which require faster operation than has been available using the slower buses (such as a graphics card for an output display device) are joined to this faster local bus. However, it is most desirable to be able to continue to utilize those components which were designed to operate with the older buses and which operate at a slower rate. In order to do this, the slower ISA or EISA bus is continued in essentially unchanged form; and those components which are able to tolerate longer access times are associated with the slower bus. It is then necessary to provide arrangements by which data may be transferred between all of the computer system components. This requires complicated interfacing arrangements. Although the theory behind using a local bus is good, many local bus designs have created conflicts in accessing components which actually slow the operation of the computer.

Intel Corporation has designed a new local bus which may be associated in a computer system with other buses such as an ISA bus or an EISA bus (which are hereinafter referred to broadly as secondary buses). This new local bus provides faster throughput of data for selected components of the system without the conflicts which may arise using other local bus systems. This new bus is referred to as the "peripheral component interconnect" (PCI) bus. A computer system using this PCI bus includes in addition to the physical PCI bus a first bridge circuit which provides the interface and controls the transfer of data among the PCI bus, the central processing unit, and main memory. A second bridge circuit is also provided as an interface between and a control for the transfer of data between the PCI bus and any secondary bus. Thus, the arrangement is such that components on the PCI bus transfer data to and receive data from main memory through the first bridge which joins to the central processor and to the main memory; while components on a secondary bus transfer and receive data through the second bridge and through the PCI bus for transfers with components on the PCI bus, and through the second and first bridges and the PCI bus for transfers with the central processor and the main memory.

Various designs of secondary bridges have been proposed. Specific embodiments of such bridges are described in detail in a publication entitled 82420/82430 *PCIset, ISA and EISA Bridges*, 1993, Intel Corporation. The design of these bridges is complicated by various factors. For example, each of the PCI and secondary buses is designed with controlling rules of operation (protocols) which must be adhered to in designing a bridge to connect the two disparate buses.

For example, the first bridge circuit which joins the central processing unit and main memory to the PCI bus is designed to buffer transfers of data so that a faster processor need not slow to the speed of the bus in transferring data. All bridge circuits joined to the PCI bus provide similar buffers. Buffering data write operations requires that data transfer operations be completed in a specific precise order to maintain data coherency. On the other hand, the secondary buses were designed without buffered transfers in mind. Once a bus master on one of these secondary buses gains access to the bus, it cannot be forced to relinquish its access. Certain of these secondary bus masters are required to complete operations on the secondary bus within a prescribed period of time and so must maintain their access and quickly complete their operations; failure to do so causes a non-recoverable system error. Consequently, if that access extends to the PCI bus (for example, to read from main memory), then the PCI bus will also be owned by the secondary bus master and will lose its speed advantage. Because of the different bus protocols, the transfer of data by a bridge has been found to be very complicated.

One problem which is inherent in the interfacing of the two buses into a single system is the problem of arbitrating for the buses. Since the PCI bus is designed to operate very rapidly, it is important that any operations on that bus take place without delay. For example, it is important that a PCI bus master not be required to wait on the PCI bus when it attempts to access the secondary bus for to do so would cause the PCI bus to lose the speed advantage for which it was designed. On the other hand, it is also necessary that components on the secondary bus have a fair chance of gaining access to the PCI bus and the various components on that bus such as main memory.

These last mentioned aims require unique circuitry be utilized for providing access to the PCI and secondary buses. Moreover, this circuitry must conform to the protocols and arbitration specifications of the individual buses in the system.

SUMMARY OF THE INVENTION

It is, therefore, an object of the present invention to allow a bus master on a primary bus having a rapid data transfer rate to gain access through a bridge to a slower secondary bus in a multiple bus system without waiting on the primary bus and without being required to retry access an inordinate number of times.

It is a more specific object of the present invention to provide improved arbitration circuitry capable of allowing rapid access to a secondary bus by a PCI master while providing access on a fair basis to the secondary bus for both PCI bus masters and secondary bus masters in a multiple busing system.

It is another object of the present invention to accomplish each of the above objects while conforming to the protocols of the individual buses in the computer system.

These and other objects of the present invention are realized in a bridge circuit adapted to be associated with a PCI and secondary bus circuits which bridge circuit includes circuitry for storing an indication that a particular PCI bus master has attempted an access of the secondary bus and has been forced to retry that access, circuitry for masking any retry by a retrying PCI bus master until the bus is again available, and circuitry for providing an interval during which a retrying PCI bus master is guaranteed access to the secondary bus in favor of a secondary bus master after the secondary bus is relinquished so that a sequence of retry operations by a PCI bus master causing a thrashing condition on the PCI bus is not generated to cause a thrashing condition on the PCI bus.

These and other objects and features of the invention will be better understood by reference to the detailed description which follows taken together with the drawings in which like elements are referred to by like designations throughout the several views.

NOTATION AND NOMENCLATURE

Some portions of the detailed descriptions which follow are presented in terms of symbolic representations of operations on data bits within a computer memory. These descriptions and representations are the means used by those skilled in the data processing arts to most effectively convey the substance of their work to others skilled in the art. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary or desirable in most cases in any of the operations described herein which form part of the present invention; the operations are machine operations. Useful machines for performing the operations of the present invention include general purpose digital computers or other similar devices.

In all cases the distinction between the method operations in operating a computer and the method of computation itself should be borne in mind. The present invention relates to a method and apparatus for operating a computer in processing electrical or other (e.g. mechanical, chemical) physical signals to generate other desired physical signals.

DETAILED DESCRIPTION

Figure 1:
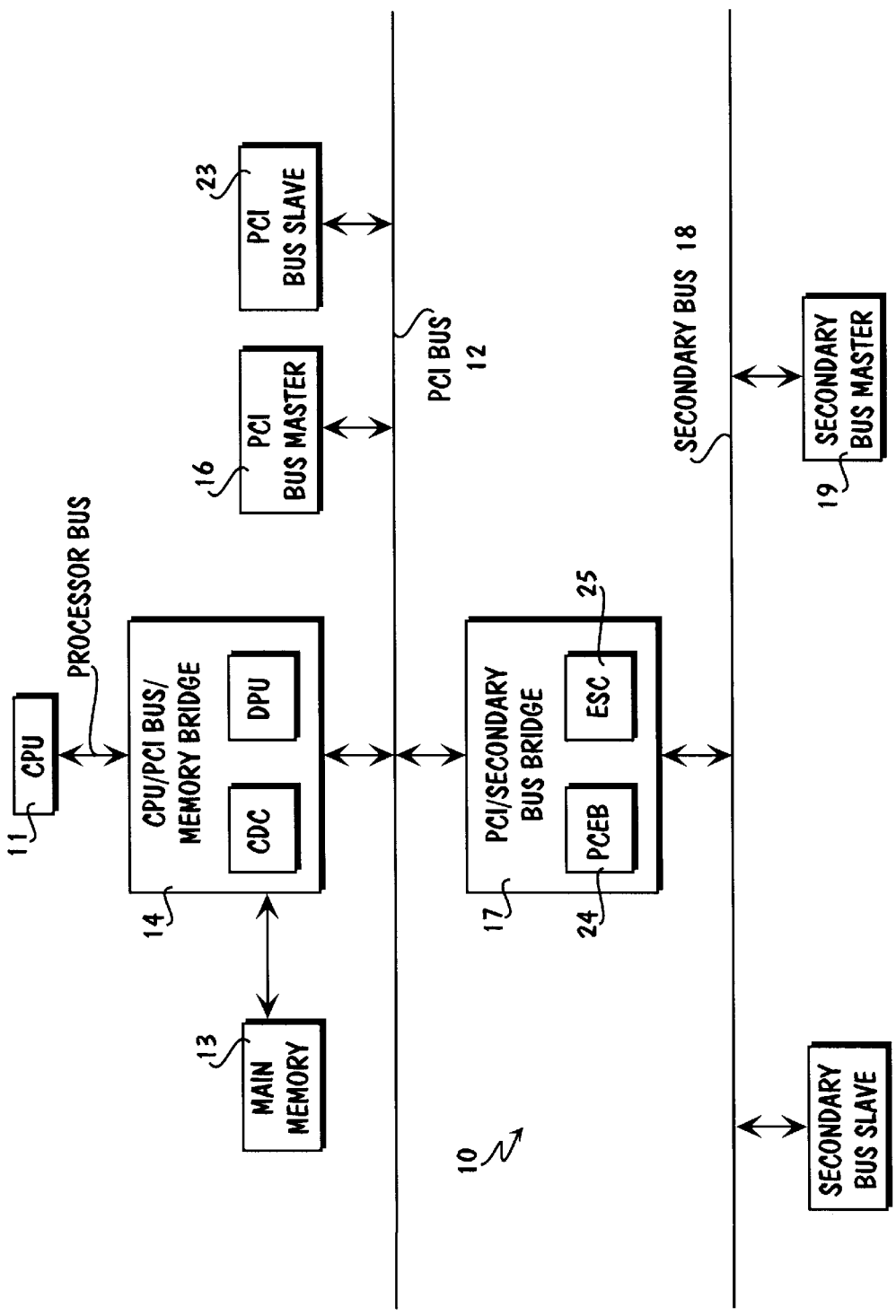
FIG. 1 is a block diagram of a computer system including a plurality of buses including at least a PCI bus and a secondary bus.

Referring now to FIG. 1, there is illustrated a computer system 10. The system 10 includes a central processor 11 such as an Intel i486™ microprocessor which carries out the various instructions provided to the computer 10 for its operations. The central processor 11 is joined to a bus 12 adapted to carry information to various components of the system 10. The bus 12 is designed as a PCI bus in order to allow the transfer of data to and from the central processor 11 at a rate faster than is possible with the typical ISA or EISA buses used by the prior art. The processor 11 is joined to the bus 12 by a bridge circuit 14 which is adapted to provide various functions necessary to the transfer. Also joined to the PCI bus 12 by the bridge circuit 14 is main memory 13 which is typically constructed of dynamic random access memory arranged in a manner well known to those skilled in the prior art to store information during a period in which power is provided to the system 10. The bridge circuit 14 is physically constructed to include both a cache and dram controller (CDC) chip and a data path unit (DPU) chip each of which is manufactured by Intel Corporation of Santa Clara, Calif. Detailed descriptions of these chips are provided in *Cache & DRAM Controller (CDC) 82424TX* and *Data Path Unit (DPU) 82423TX*, each published by Intel Corporation. The bridge 14 includes circuitry for interfacing the central processor 11 and main memory 13 to the bridge 14, for interfacing the bridge 14 to the PCI bus 12 as either a bus master or a bus slave, and cache control and data synchronization circuitry. In general, the bridge circuit 14 includes circuitry for controlling and accomplishing the transfer of data among the central processor 11, main memory 13, and the PCI bus 12. Among the circuitry included in the bridge 14 and specifically in the data path unit are a number of buffer circuits which may store data being transferred among the central processor 11, main memory 13, and the PCI bus 12.

As has been set out above, the buses historically used with Intel microprocessors in computer systems (ISA and EISA buses) do not run as fast as is desirable. For this reason, the new PCI bus has been designed to run at a speed closer to the speed of the processors. A faster data transfer rate has been accomplished by utilizing a bus width of thirty-two bits, by allowing operations at increased frequencies, and by buffering data transfers. Buffering has been provided in the bridge circuit 14 so that a CPU 11 operating at a higher data transfer rate than the PCI bus 12 may store data in the bridge and continue with other operations while the bridge completes the transfer of stored data. This buffering of data greatly improves the speed of data transfer in the computer system 10 but requires that strong ordering be enforced in data transfer operations.

Also connected to the PCI bus 12 is a PCI bus master circuit 16 which may be one of a number of different component circuits. The main properties of a PCI bus master are that it includes a microprocessor or controller which functions at some internal clock rate and that it may initiate and control operations on the PCI bus 12. A PCI slave circuit 23 may also be connected to the PCI bus 12. Such a PCI slave circuit 23 may be, for example, a video output card having a frame buffer adapted to store video signals to be transferred to an output device such as a monitor for display.

Also connected to the PCI bus 12 is a PCI/secondary bus bridge circuit 17. The bridge circuit 17 performs the various functions necessary to transfer data between the PCI bus 12 and various component circuits joined to a secondary bus 18. The secondary bus 18 may be an ISA bus, an EISA bus, or some other bus which typically transfers data at a slower rate than does the bus 12. Specific PCI to secondary bus bridge circuits 17 manufactured by Intel Corporation are described in detail in the publication referred to above entitled 82420/82430 *PCIset, ISA and EISA Bridges*. Such a bridge 17 includes circuitry for providing the interface between the PCI bus 12 and the secondary bus 18 so that data may be transferred therebetween.

Because of the different transfer rates on the PCI bus and the secondary bus, a number of buffers adapted to store data being transferred between the two buses are included among this circuitry. Buffering in the bridge circuit 17 which joins the two buses 12 and 18 offers substantial advantages. For example, when a faster bus is trying to write to a slower bus without buffering, the speed of the transfer necessarily slows to the speed at which the slower bus can accept the data. When transferring in the other direction without buffering, the speed of transfer to the faster bus can only approach the speed at which the components on the slower bus are able to transfer data. The bridge 17 provides circuitry which allows it to operate as an intercoupling bus master or a bus slave on the PCI bus 12 and, in a similar manner, as a bus master or a bus slave on the secondary bus. The ability of the bridge 17 to act as a PCI bus master allows a bus master circuit 19 positioned on the secondary bus 18 (for example, local area network circuitry) to gain access to the PCI bus 12 and from there to the main memory. One embodiment of the bridge 17 includes a first arbiter circuit for controlling access to the PCI bus 12 and a second arbiter circuit for controlling access to the secondary bus 18.

As is illustrated in FIG. 1, the PCI bus has been integrated into computer systems along with the older buses so that components designed for the older buses may continue to be used. A number of problems have arisen in attempting to integrate buses designed with substantially different characteristics into the same computer system. For example, one problem which has arisen with integrating the newer PCI bus into a computer system with the older secondary buses is that each of these older buses was designed so that a bus master on that older bus which gains access to the bus owns the bus until it has completed its operation. It cannot be forced off of the bus.

On the other hand, the PCI bus is designed to provide high data transfer rates and short access latencies through the use of buffered transfers. A primary advantage offered by the PCI bus is its speed of data transfer. If a PCI bus master cannot gain access through the bridge 17 to a component on the secondary bus and is forced to wait on the PCI bus for the secondary bus, then the PCI bus transfer rate will be drastically reduced. To eliminate this problem, the PCI protocol provides a retry operation so that a PCI master does not wait on the bus when it cannot gain access to a component but is instead required to retry its attempt to gain access after some period. This eliminates the problem of a bus master occupying the PCI bus while it waits for the secondary bus.

However, prior art implementations of the retry operation can cause a reduction of the data transfer rate on the PCI bus. For example, if it is impossible for a PCI bus master to gain access when it retries its access, each retry arbitration simply decreases the time available for other bus masters on the PCI bus whether their activities involve the bridge 17 or involve data transfers between only components on the PCI bus. A sufficient number of retry operations creates a thrashing condition which drastically reduces the time available for actual data transfer on the PCI bus. Consequently, a bus master on the PCI bus must be able to gain access to the secondary bus without waiting on the PCI bus and without being involved in time consuming multiple retries which reduce the PCI bus transfer rate.

On the other hand, this problem cannot be resolved by simply granting access whenever a PCI bus master asserts a request. Presuming that it were possible to grant immediate access to a PCI bus master (and it is not since a secondary bus master on the bus cannot be forced off), if a PCI bus master were to be always granted an access whenever it asserted a request, then bus masters on the secondary bus would not be able to gain access in competition with the a PCI bus master no matter how important the operation. For example, a direct memory access (DMA) device on the secondary bus may greatly accelerate the operation of the computer system by relieving the central processing unit of the need to accomplish the transfer of data between input/output and sequential memory addresses. But to accomplish this, the DMA device functioning as a secondary bus master must be able to access main memory through the secondary bridge, the PCI bus, and the PCI bridge.

Figure 2:
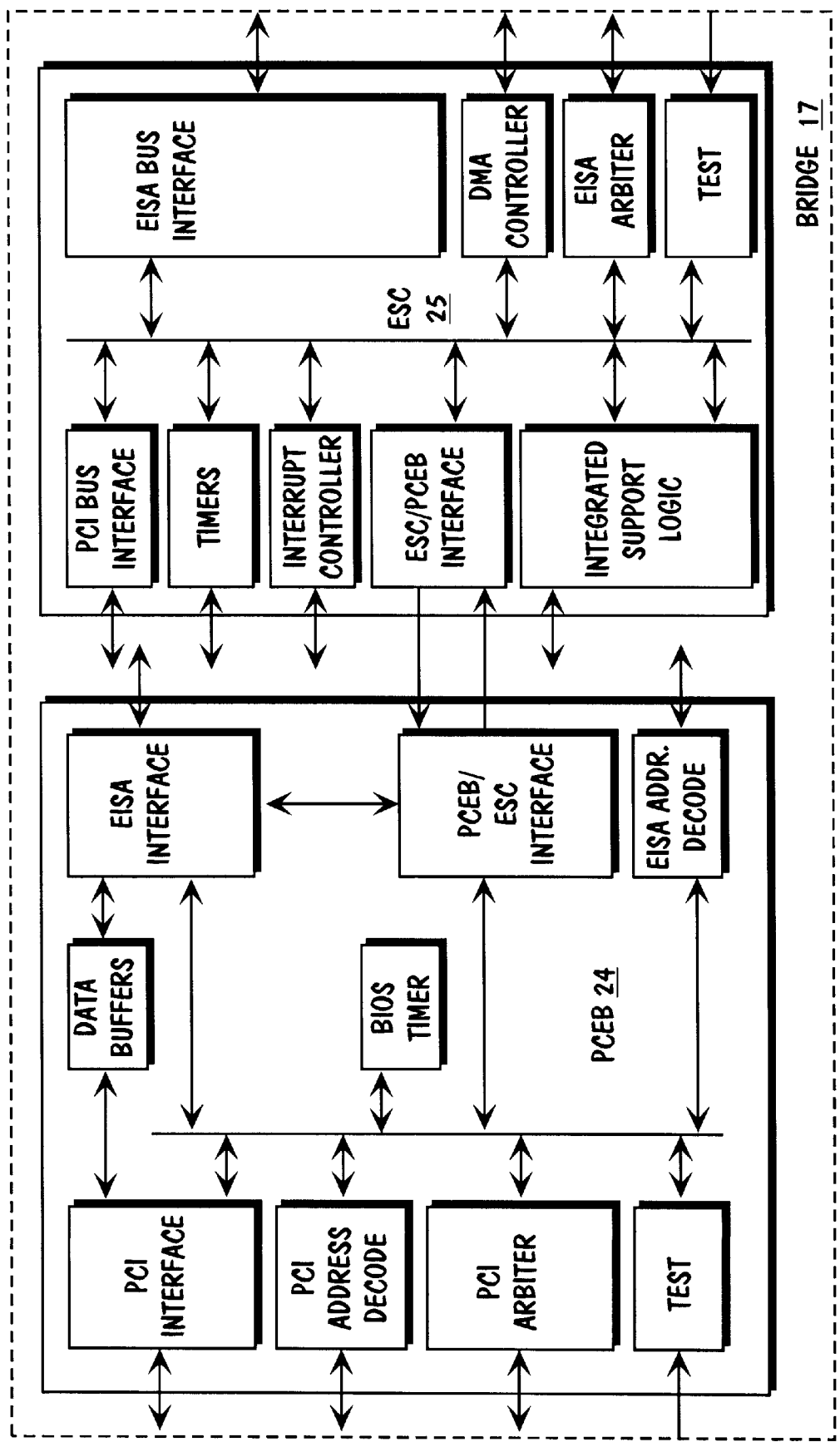
FIG. 2 is a block diagram of the components of a bridge circuit for connecting a PCI bus and a secondary bus as shown in FIG. 1 in accordance with the present invention.

The present invention resolves these problems of the prior art. FIG. 2 is a physical block diagram of the circuitry included in one embodiment of a bridge circuit 17. The bridge circuit 17 includes a pair of integrated circuit chips referred to respectively as a PCI/EISA bridge (PCEB) 24 and an EISA System Controller (ESC) 25. These integrated circuit chips are described in detail in the publication entitled 82420/82430 *PCIset, ISA and EISA Bridges*, referred to above. In general, the PCEB chip 24 includes the circuitry for transferring data between the two buses, while the ESC chip 25 includes the circuitry for controlling access to the secondary bus.

As is shown in FIG. 2, the PCEB chip 24 includes PCI interface circuitry for joining to the PCI bus 12 and EISA interface circuitry for joining to the secondary bridge 18. Each of these interface arrangements includes circuitry for providing bus master and bus slave functions on the associated bus. The PCEB chip 24 also includes posted write buffers and line buffers which are used for transferring data between the two buses. A PCI address decoder and an EISA address decoder are utilized to translate addresses across the bridge. In one embodiment, a PCI arbiter circuit for controlling access to the PCI bus is a part of the PCEB circuit. In addition, PCEB/ECS interface circuitry provides an interface for signals between the PCEB and ESC portions of the bridge 17. Certain other circuitry not pertinent to the present invention is also included in the embodiment illustrated.

The ESC chip 25 also includes a PCI bus interface for handling a few control signals transferred between the PCI bus and the ESC circuit, and an ESC/PCEB interface for handling the majority of the control signals between the two integrated circuit chips 24 and 25 which make up the bridge 17. An EISA bus interface, an EISA arbiter circuit, and EISA bus control circuitry provide a bus control arrangement which functions in the typical manner of an EISA bus controller to provide access to the different components on the secondary bus. Also illustrated in the embodiment shown are a DMA controller circuit for the secondary bus and an interrupt controller circuit both of which are integrated into the ESC circuitry. Various other circuitry such as timers and test circuitry are also included in the embodiment of FIG. 2.

Figure 3:
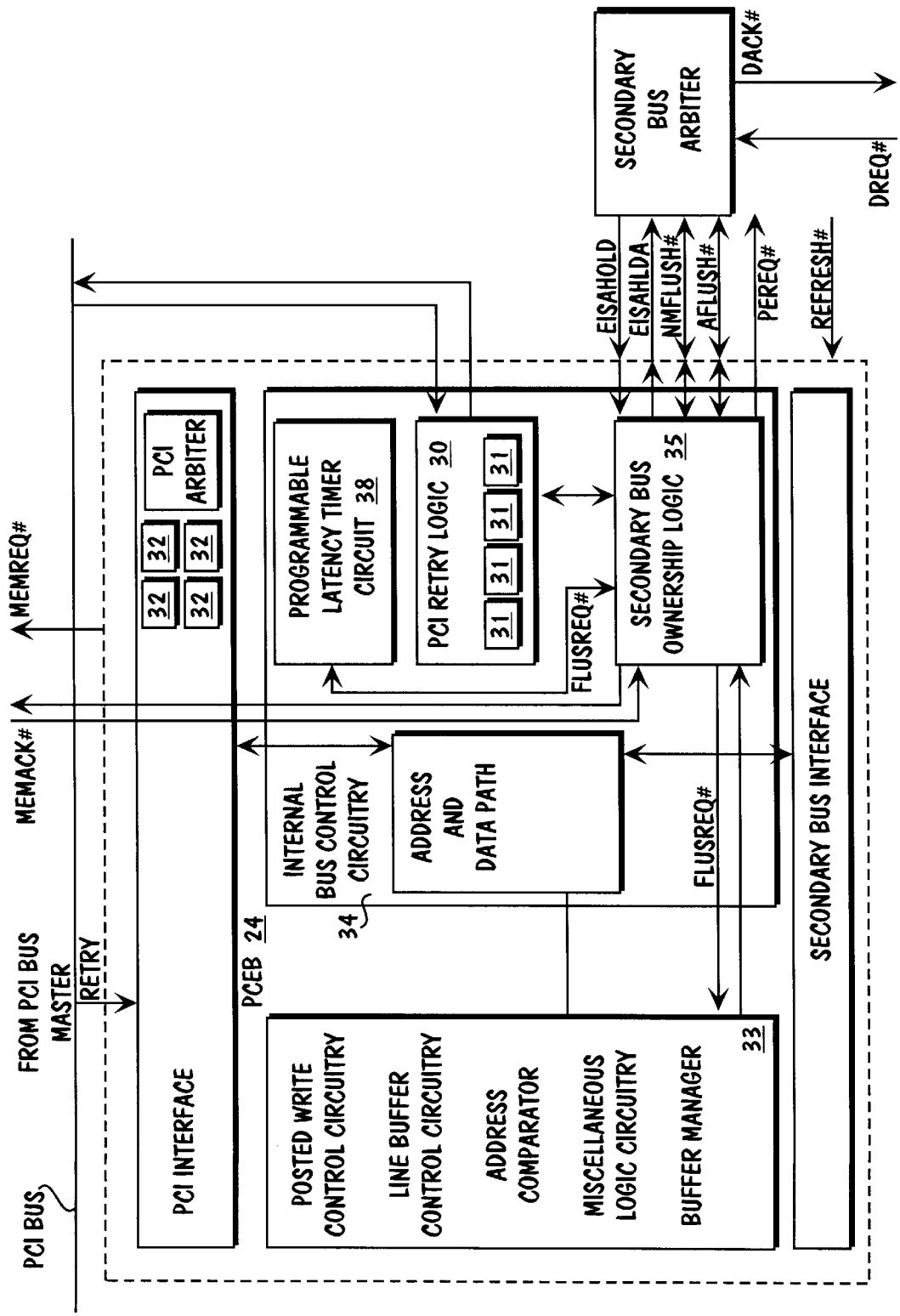
FIG. 3 is a more detailed block diagram of the functional components of the bridge circuit illustrated in FIG. 2 for connecting a PCI bus and a secondary bus in accordance with the present invention.

FIG. 3 illustrates a functional block diagram of a portion of the circuitry of the bridge 17 shown in FIG. 2 designed in accordance with the present invention to control the arbitration for the secondary bus and PCI buses. It may be useful to consider FIG. 4 as well which is an additional block diagram illustrating particularly the circuits utilized in the present invention and including various control signals utilized therewith. As may be seen in FIG. 3, the PCI interface circuitry is arranged to provide the interface for transferring data and addresses to and from the PCI bus. In this functional diagram, the PCI arbiter circuitry is arranged as a part of the PCI interface circuitry because of its logical association therewith. In a similar manner, the secondary bus interface circuitry is arranged to provide the interface for transferring data and addresses to and from the secondary bus (e.g., an EISA bus). Within the PCEB chip 24 are arranged a buffer manager circuit 33 and an internal bus control circuit 34. The buffer manager 33 includes control circuitry including state machines for causing the operation of posted write buffers; control circuitry including state machines for causing the operation of line buffers; address comparator circuitry for controlling selection of addresses for particular buffers and bytes, word, and double word portions of individual buffers; a line buffer sequencer which responds to addresses from the address comparator to direct the addresses used by the line buffer control circuitry; a line buffer transfer request circuit, and various miscellaneous logic. The internal bus control circuitry 34 includes a bus ownership control logic circuit which includes logic for determining at any time the ownership of the various data paths through the PCEB chip 24. The circuitry 34 also includes the address and data paths including the physical line buffers and posted write buffers. A retry logic circuit which includes a number of state machines which track the status of the various components of the bridge 17 and the condition of the buses and a secondary bus latency timer circuit the operation of which is discussed below are also a part of the internal bus control circuit 34.

To facilitate transfers between the two buses 12 and 18, the bridge 17 has been designed so that access to the secondary bus 18 is granted to the bridge circuit 17 (specifically to the data transfer portion of the PCEB chip 24 including the data buffers) as a secondary bus master whenever no other secondary bus master has access to the bus. This allows the bridge 17 to service requests for the PCI bus should they be forthcoming without the necessity of arbitrating for the secondary bus when the secondary bus is not is use.

In order to cause this result, the circuitry normally used for arbitrating access to the PCI bus and the secondary bus are modified in accordance with the present invention. The protocol by which the bridge circuit 17 gains access as a bus master to the secondary bus 18 provides that on startup of the system, the PCEB chip 24 acting as a secondary bus master for the PCI devices owns the bus. This is the default condition. To cause this to happen, a new secondary bus ownership logic circuit 35 is provided as a portion of PCEB chip 24 of the bridge 17. This circuit 35 is a part of a larger block of circuitry generally referred to as an internal bus control circuit. In general, the circuit 35 is a state machine designed in a manner well known to those skilled in the art for controlling the operation of the address and data path circuitry. The circuit 35 overrides the operation of the secondary bus arbiter in the ESC chip 25 and places ownership of the secondary bus with the bridge 17 whenever the secondary bus is free. Whenever a secondary bus master desires access to the secondary bus 18, it signals the secondary bus arbiter circuit in the ESC chip 25 in a typical manner such as by asserting a DREQ# signal. The secondary bus arbiter in the ESC chip 25 responds to this signal by asserting an EISAHOLD signal to the secondary bus ownership logic circuit 35 in the PCEB chip 24. If the PCEB chip 24 of the bridge 17 as a secondary bus master is not using the secondary bus 18, the secondary bus ownership logic circuit 35 may signal the secondary bus arbiter by asserting an acknowledge signal EISAHLDA which signifies that the secondary bus arbiter may have the bus. This allows the secondary bus arbiter to transfer access to the requesting secondary bus master in accordance with its normal functions.

The internal bus control circuitry 34 of the PCEB chip 24 shown in FIG. 3 also includes PCI retry logic circuit 30. The retry logic circuit 30 includes both combinational logic and a number of state machines which track the states of the individual buffers of the address and data path and the availability of the buses among other things. Among the logic included in the retry logic circuit 30 are individual bit registers 31 for each bus master on the PCI bus. A register 31 is provided for each particular PCI bus master. A register 31 is set for a particular PCI bus master whenever a request for access to the PCI bus in order to access the secondary bus is received from that PCI bus master and the secondary bus 18 is not available. When the register bit is set, it is known that a particular PCI bus master has attempted access to the secondary bus 18 using the bridge 17 and that the access attempt has not been successful. In response to this access attempt during which the register bit is set, the PCI retry logic circuit 30 issues a retry command to the PCI bus master attempting access to the secondary bus.

The bit set in the individual bit register 31 for each PCI bus master attempting access to the secondary bus masks that bus master and precludes the PCI arbiter circuitry from recognizing any additional request for access to the PCI bus by the particular PCI bus master until the bridge circuit 17 acting as a bus master on the secondary bus has regained control of the secondary bus. This precludes any retry by the PCI bus master by masking the request of the PCI bus master until the secondary bus 18 has once again become available and, thus, eliminates the problem of thrashing on the PCI bus caused by a series of attempts to access the bus by a retrying PCI bus master. When the bridge 17 once again regains control of the secondary bus, the bit set in the register 31 for any PCI bus master retried due to an access to the secondary bus is cleared so that the PCI bus master may again retry its access to the PCI bus 12.

This solves the first problem posed by the need to free the PCI bus of PCI bus masters retrying access to the secondary bus and thereby slowing operations on the PCI bus. However, it does not remove a second problem. For example, it is entirely possible that the PCI bus master retrying access to the secondary bus will retry an operation after some other bus master on the secondary bus has asserted a request for the bus and has gained access or will lose an arbitration contest to a higher priority PCI bus master. This will force the PCI bus master retrying access to the secondary bus into another retrying situation which will waste bus bandwidth on the PCI bus and could also result in long latencies for PCI bus masters.

In order to overcome this problem, the present invention combines a latency timing circuit 38 and a plurality of state machines 32 with the registers 31 described above. The latency timing circuit 38 is a part of the internal bus control circuitry and is a timing circuit such as a counter which may be programmed with a varying programmable value stored by the system software. The state machines 32 may be a part of or associated with the PCI arbiter circuit. When the latency timing circuit 38 is running, it provides a time period during which a retrying PCI bus master, if it attempts an access to the secondary bus, is guaranteed access to the secondary bus. This eliminates the ability of any bus master on the secondary bus to acquire access to the secondary bus during the time interval in which the PCI bus master should be retrying access to the secondary bus and helps to eliminate thrashing on the PCI bus caused by retry operations to the bridge 17.

In one embodiment of the invention, the circuit 38 is an eight bit counter. The eight bits allow the time period during which the arbitration circuitry responds only to the PCI bus master retrying its attempt to gain access to the secondary bus to be set between 30 nanoseconds and 7.68 microseconds. This provides a wide range of values which may be adapted to any particular computer system.

The circuitry of one embodiment is also arranged to provide most efficient utilization of the latency timer circuit 38. In this embodiment, the timer circuit 38 is not enabled when the secondary bus 18 is released to the bridge 17 because it may not be necessary to provide a delay during which secondary bus access is masked in order to allow time for the PCI bus master to gain access. For example, the retrying PCI bus master may be the only bus master on either bus attempting to gain access to the secondary bus, or no PCI bus master may be retrying an access to the secondary bus.

To solve this problem and assure that the timer is used only when it is necessary, the PCI retry logic circuit 30 also sets a state in the state machine 32 associated with the PCI arbiter whenever a PCI bus master attempts to access the secondary bus and the PCI retry circuitry generates a retry because the secondary bus is not available (whenever a bit is set in the register 31). The bit indicates that a retry command has been issued to a PCI bus master attempting access to the secondary bus. Then, when the bridge 17 regains access to the secondary bus and the registers 31 are cleared so that the PCI bus masters may retry access to the PCI bus, the condition of the state machine 32 remain set. Thus, until the PCI bus master has actually retried its access to the PCI bus and gained access to the secondary bus, the condition of the state machine 32 remains set to indicate that a retry command has been issued for an attempted access to the PCI bus and that the bus master has not completed its operation. If the condition of the state machine 32 indicates that a retry operation by a PCI master attempting access of the secondary bus is outstanding, when the bridge 17 gains access to the secondary bus and if a bus master on the secondary bus attempts to gain access to the secondary bus, then the concurrence of these conditions causes the latency timer to start and begin its count. This is accomplished by the secondary bus ownership logic circuit 35 sensing the condition of the state machine 32 and determining whether a secondary bus master is requesting access. The signal EISAHOLD by which the secondary bus arbiter circuit asserts access to the secondary bus is used to indicate to the secondary bus ownership circuit 35 when a request from a secondary bus master exists. If no EISAHOLD signal is asserted, then the latency timer need not start. However, if the ownership of the secondary bus has reverted to the PCEB chip 24 as a bus master on the secondary bus and the signal EISAHOLD is asserted, then the secondary bus ownership circuit 35 starts the latency timer circuit. By recognizing these signals, the ownership logic circuit 35 knows that a secondary bus master is requesting access and if a retry by a PCI bus master is outstanding, it starts the latency timer circuit running.

Once the latency timing circuit 38 starts and during this timing period, a PCI bus master retrying access to the secondary bus can gain access to the secondary bus. If a retrying PCI bus master attempting access to the secondary bus completes its access, the condition of the state machine 32 indicating an outstanding retry for that PCI bus master is cleared. However, conditions set in other state machines 32 (associated with other PCI bus masters forced to retry their accesses) to indicate outstanding retries remain set so that if during the running of the timer another PCI bus master retrying access to the secondary bus exists, then this second PCI bus master retrying access to the secondary bus will gain access to the secondary bus before any bus master on the secondary bus will be allowed to gain access to the secondary bus.

In this manner, retrying PCI bus masters attempting access to the secondary bus are allowed to gain immediate access to the secondary bus during a period after a first retry command is issued. Moreover, the timer circuitry is not enabled and does not require PCI bus time unless both a retry is outstanding and a bus master on the secondary bus attempts an access. This system also allows a bus master on the secondary bus to gain access after the timer runs out or when no state machine 32 retains a condition indicating an unfulfilled retry. At this point, the ownership circuit 35 asserts the EISAHLDA signal allowing the secondary bus master to access the secondary bus. In any case, if no retry exists, then the latency timer circuit 38 does not start; and a bus master on the secondary bus is not precluded from gaining access to the secondary bus.

As far as the secondary bus arbiter circuit is concerned, the secondary bus master circuitry of the PCEB chip 25 is just another device on the secondary bus. However, as explained above, this is not the case because of the overriding function provided by the secondary bus ownership circuit 35. The inclusion of the new functions provided by the secondary bus ownership circuit 35 and the other elements of the present invention requires that especial attention be paid to the protocols of the two buses.

More particularly, the new PCI bus was designed so that transfers of data could be accomplished as rapidly as possible and interrupted by other operations. As has been pointed out, this is accomplished by buffering the operations on the PCI bus. One consequence of this buffering is the PCI protocol which emphasizes strong ordering. More particularly, write operations which change data stored in memory in devices on the PCI bus must be completed before read operations of that memory are allowed so that data coherency is maintained. For example, when data which is being written by the central processor 11 to a device on the secondary bus through the PCI bus 12 is buffered and the write to the buffer is completed, the central processor 11 typically sets a valid flag in memory for other components to read. Until the write of the data in the buffer is completed, another component may read the flag and assume the data at the addressed position is valid while some of that data remains in the buffer. Similarly, if a bus master on the secondary bus writes to main memory and that data is buffered in the bridges 14 and 17, the data must be flushed to its address in memory before that data may be read by another component on any of the buses. This requirement that write operations be completed before read operations may begin requires that the buffers in the bridge 14 and the bridge 17 be flushed so that the write data is sent to its addressed destination whenever a read operation occurs.

For this reason, the PCEB chip 24 when acting as a secondary bus master must flush its buffers whenever a change in ownership of the secondary bus occurs. In order to accomplish this, the ownership circuit 35 responds to signals generated by the secondary bus arbiter circuit in the ESC chip 25 which indicate a change in ownership by flushing all of its internal buffers. EISAHOLD, EISAHLDA, and NMFLUSH are three signals used for the handshake protocol on the secondary bus. EISAHOLD is asserted by the ESC chip 25 on behalf of a request from a secondary bus master or for a refresh cycle. The bus ownership circuit 35 responds to this by asserting EISAHLDA, an acknowledge signal. If the request is only for a refresh cycle, then a buffer flush does not have to occur. However, if a secondary bus master desires to do a cycle, then an ownership change is to occur; and the PCEB chip 24 must flush its buffers before giving control to the new secondary bus master. To start a flushing operation, an active low signal NMFLUSH# is asserted by the ESC chip 25 for one clock period and then floated to indicate that a new master is going on the secondary bus. This indicates that the PCEB chip 24 should flush all of its internal buffers. After this first clock period, the PCEB chip 24 owns the signal and drives the signal low as long as flushing continues. When flushing of the buffers in the bridge 17 and the system is complete, the PCEB chip 24 drives the signal NMFLUSH# high for one clock and then floats the signal to complete the handshake. When flushing is complete, the ESC chip 25 drives the signal NMFLUSH# high and has control of the secondary bus.

In order to actually flush data in PCI bridge buffers (which data is directed to a component on the secondary bus when a secondary bus master is requesting access to the secondary bus in an attempt to read through the same bridge), the system provides a number of control signals which are used. In response to the initial indication provided by the signal NMFLUSH# from the ESC chip 25 that a secondary bus master is requesting access to the secondary bus, the PCEB chip 24 generates an internal FLUSHREQ signal to flush its internal buffers. The PCEB chip 24 also generates a FLUSHREQ# signal which requests that all other PCI bridges connected to the PCI bus 12 flush any data posted to buffers from which data might be transferred to the secondary bus. In one embodiment, this FLUSHREQ# signal is a hardwired signal so that traffic on the PCI bus is not increased. This FLUSHREQ# signal is received by the bridges to the PCI bus (such as the bridge 14). Each of these other bridges responds to the FLUSHREQ# signal by determining whether any data is posted to its buffers from which data may be sent to the secondary bus, flushing any data posted to those buffers and disabling them, and writing the data flushed to its ultimate address. This requires that any bridge to the PCI bus to which such data is posted become the bus master of the PCI bus to accomplish the completion of the write operation of the data in the buffers, a normal operation controlled in cooperation with the PCI arbiter.

Figure 4:
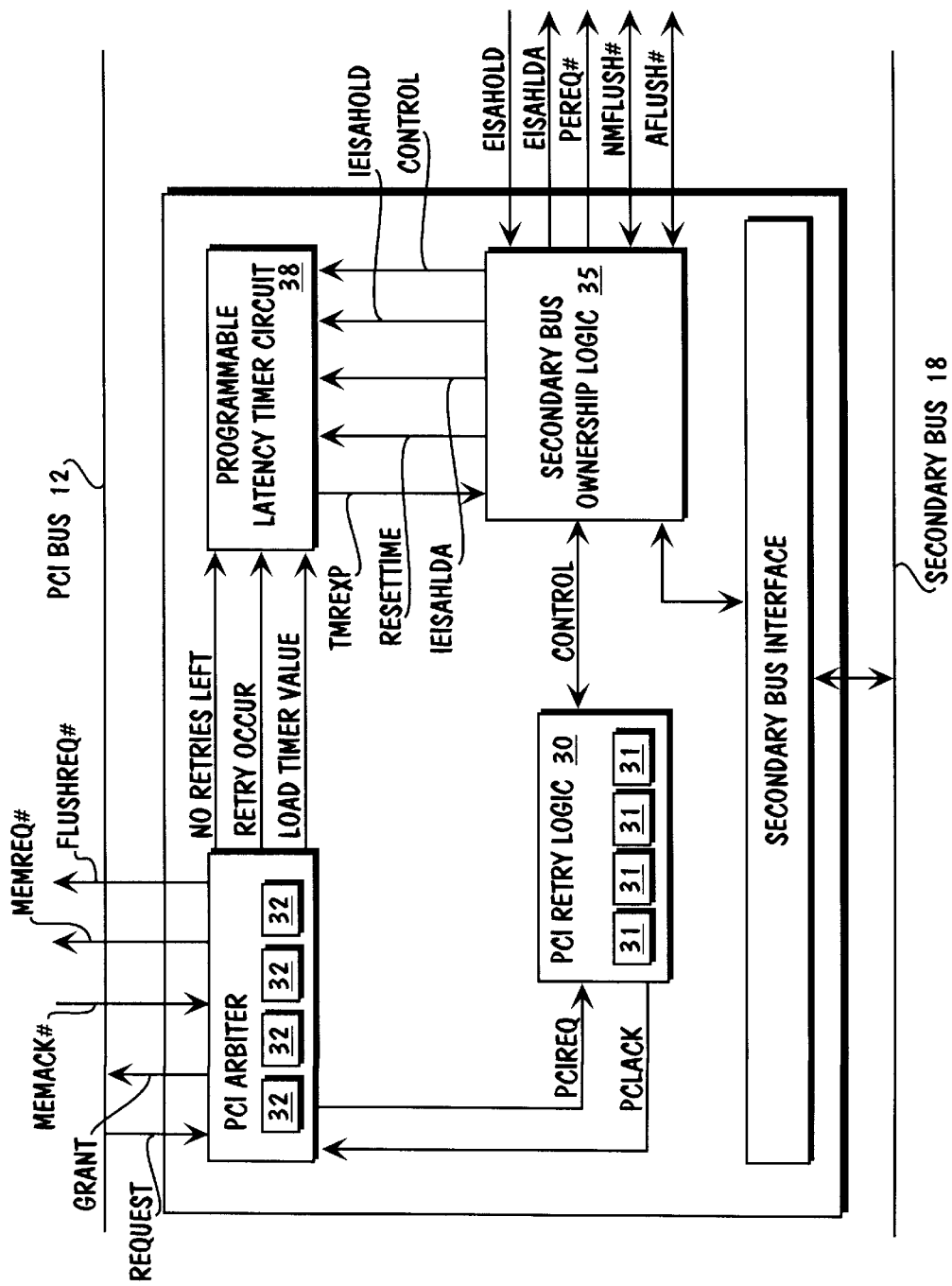
FIG. 4 is an additional block diagram illustrating particularly the circuits utilized in the present invention and including various control signals utilized therewith.

In the bridge 14 illustrated in FIG. 4, the FLUSHREQ# signal causes a host-to-PCI buffer control circuit to be flushed because the only data which may conceivably be sent to the secondary bus is that which may be stored in the set of host-to-PCI buffers. As pointed out, flushing the buffer requires that the bridge 14 gain access to the PCI bus in order to complete its write operation. This is a normal operation of the PCI arbiter 20 and is explained in detail in the above-mentioned publications. When the flush operation (if necessary) has been completed, the bridge 14 generates a MEMACK# signal to indicate that the buffer flushing has been completed. The MEMACK# signal is sent to the bridge 17 to indicate the completion of the flush operation by the bridge 14.

The FLUSHREQ# signal is also directed within the bridge 17 in its capacity as a PCI bus master and causes any data in buffers in the bridge 17 to be similarly flushed. More particularly, the FLUSHREQ# signal is transferred to the ownership control circuit 35. The circuit 35 reads the condition of the buffers in the address and data path from the retry circuitry and flushes the data by transferring it to its designated address in a flush operation. Upon completion of the flush operation, a local MEMACK# signal is generated to indicate this fact.

Once a MEMACK# signal has been received from each bridge circuit on the PCI bus, the ownership control circuit 35 acknowledges the flush completion by sending a NMFLUSH# signal to the secondary bus arbiter circuit which may then grant access to the secondary bus to the requesting secondary bus master so that the secondary bus master may acquire of access the secondary bus.

It should be specifically noted that the secondary bus arbiter is set up so that a NMFLUSH# signal is not generated when a memory refresh signal comes into the PCEB chip 24. There is no need to flush the bridge buffers on refresh since no data coherency problem exists. This minimizes bandwidth loss due to refresh operations.

Although the present invention has been described in terms of a preferred embodiment, it will be appreciated that various modifications and alterations might be made by those skilled in the art without departing from the spirit and scope of the invention. For example, although various of the components which make up the present invention are physically positioned within the chips which make up the bridge circuit, those skilled in the art may well position those components differently while making use of them in the same manner. The invention should therefore be measured in terms of the claims which follow.

What is claimed is:

1. A bridge circuit adapted to be associated with first and second bus circuits to transfer data therebetween comprising:

data buffers for storing data being transferred between the buses, a circuit for causing a bus master on the first bus which has attempted an access of the second bus through the bridge circuit to retry its access, circuitry for masking any retry until the second bus is again available, and circuitry for providing an interval during which a bus master on the secondary bus may not gain access to the second bus after the second bus is relinquished so that a sequence of retry operations causing a thrashing condition on the first bus is not generated.

2. A bridge circuit as claimed in claim 1 in which the circuitry for providing an interval comprises:

a circuit for storing an indication that a particular bus master on the first bus has been forced to retry its access, and a timer circuit functioning in response to an indication that a particular bus master on the first bus has been forced to retry its access for masking requests for access to the second bus by a bus master on the second bus for a predetermined interval.

3. A bridge circuit as claimed in claim 2 in which the timer circuit functions in response to both an indication that a particular bus master on the first bus has been forced to retry its access and a request for access by a bus master on the second bus.

4. A bridge circuit as claimed in claim 2 in which the timer is programmable.

5. A bridge circuit as claimed in claim 2 in which the circuit for storing an indication that a particular bus master on the first bus has been forced to retry its access is a state machine.

6. A computer system comprising:

a central processor;

main memory;

a first bus adapted to be connected to bus master and bus slave circuitry;

a second bus adapted to be connected to bus master and bus slave circuitry; and a bridge circuit adapted to transfer information between the first and the second buses, the bridge circuit comprising data buffers for storing data being transferred between the buses, a circuit for causing a bus master on the first bus which has attempted an access of the second bus through the bridge circuit to retry its access, circuitry for masking any retry until the second bus is again available, and circuitry for providing an interval during which a bus master on the second bus may not gain access to the second bus after the second bus is relinquished so that a sequence of retry operations causing a thrashing condition on the first bus is not generated.

7. A computer system as claimed in claim 6 in which the circuitry for providing an interval comprises:

a circuit for storing an indication that a particular bus master on the first bus has been forced to retry its access, and a timer circuit functioning in response to an indication that a particular bus master on the first bus has been forced to retry its access for masking requests for access to the second bus by a bus master on the second bus for a predetermined interval.

8. A computer system as claimed in claim 7 in which the timer circuit functions in response to both an indication that a particular bus master on the first bus has been forced to retry its access and a request for access by a bus master on the second bus.

9. A computer system as claimed in claim 7 in which the timer is programmable.

10. A computer system as claimed in claim 7 in which the circuit for storing an indication that a particular bus master on the first bus has been forced to retry its access is a state machine.

11. In a bridge circuit adapted to be associated with first and second bus circuits to transfer data therebetween, the bridge circuit being associated with circuitry for forcing a retry of an attempt to access the second bus through the bridge circuit by a bus master on the first bus when the second bus is occupied, the circuitry for forcing a retry including circuitry for masking an attempt to retry an access by a bus master on the first bus until the second bus is free, the improvement comprising:

circuitry for storing an indication that a bus master on the first bus has attempted to access the second bus through the bridge circuit and has been forced to retry its attempted access, and a timer circuit responsive to an indication provided by the circuitry for storing an indication that a bus master on the first bus has attempted to access the second bus through the bridge circuit and has been forced to retry its attempted access for masking attempted accesses by bus masters on the second bus for a predetermined period when the second bus becomes available.

12. In a bridge circuit as claimed in claim 11, the timer circuit operating only when a request is received for access to the second bus by a bus master on the second bus.

13. In a bridge circuit as claimed in claim 11, the timer circuit ceasing to mask requests for access to the second bus when no retry operation by a bus master on the first bus is outstanding.

14. In a bridge circuit as claimed in claim 11, the timer circuit continuing to mask requests for access to the second bus during the predetermined period so long any retry operation by a bus master on the first bus is outstanding.

15. In a bridge circuit adapted to be associated with first and second bus circuits to transfer data therebetween, the bridge circuit including data buffers for storing data being transferred between the buses, the bridge circuit being associated with circuitry for forcing a retry of an attempt to access the second bus through the bridge circuit by a bus master on the first bus when the second bus is occupied, the circuitry for forcing a retry including circuitry for masking an attempt to retry an access by a bus master on the first bus until the second bus is free, the improvement comprising:

circuitry for storing an indication that a bus master on the first bus has attempted to access the second bus through the bridge circuit and has been forced to retry its attempted access, a timer circuit responsive to an indication provided by the circuitry for storing an indication that a bus master on the first bus has attempted to access the second bus through the bridge circuit and has been forced to retry its attempted access for masking attempted accesses by bus masters on the second bus for a predetermined period when the second bus becomes available, and a circuit for flushing data in the data buffers whenever an ownership change is to occur on the secondary bus.

16. In a bridge circuit as claimed in claim 15, the circuit for flushing data in the data buffers whenever an ownership change is to occur on the secondary bus comprising:

a circuit for generating a request for access to the second bus, and a circuit for flushing data buffers in response to the request for access to the second bus.

17. In a bridge circuit as claimed in claim 16, the circuit for flushing data buffers in response to the request for access to the second bus including circuitry for generating a request to flush buffers in any bridge joined to the first bus.

18. A computer system comprising:

processor means;

main memory means;

first busing means associated with the processor means and main memory means and adapted to be connected to bus master means and bus slave means;

second busing means adapted to be connected to bus master means and bus slave means; and means for transferring addresses and data between the first and the second busing means, the means for transferring comprising data buffer means for storing data being transferred between the busing means, means for causing a bus master means on the first busing means which has attempted an access of the second busing means through the means for transferring to retry its access, means for masking any retry until the second busing means is again available, and means for providing an interval during which a bus master means on the second busing means may not gain access to the second busing means after the second busing means is relinquished so that a sequence of retry operations causing a thrashing condition on the first busing means is not generated.

19. A computer system as claimed in claim 18 in which the means for providing an interval comprises:
   means for storing an indication that a particular bus master means on the first busing means has been forced to retry its access, and
   timing means functioning in response to an indication that a particular bus master means on the first busing means has been forced to retry its access for masking requests to access the second busing means by a bus master means on the second busing means for a predetermined interval.

20. A computer system as claimed in claim 19 in which the timing means functions in response to both an indication that a particular bus master means on the first busing means has been forced to retry its access and a request for access by a bus master means on the second bus.

21. A method for guaranteeing access to a bus master on a first bus retrying access to the first bus in order to gain access to a second bus through a bridge circuit joining the first and the second bus when the access has been denied because the second bus is occupied, comprising the steps of:
   recording an indication that a bus master on the first bus has been forced to retry its attempt to access the first bus,
   precluding a bus master on the second bus from gaining access to the second bus in response to the release of ownership the second bus during a period if an indication exists that a bus master on the first bus has been forced to retry its attempt to access the first bus.

\* \* \* \* \*